United States Patent Office 3,375,160
Patented Mar. 26, 1968

3,375,160
METHODS OF COMBATTING GASTROPODS WITH NITRO SUBSTITUTED SALICYLANILIDES
Jack D. Early, Bethesda, Md., and John P. Chupp, Kirkwood, Mo., assignors to Monsanto Company, St. Louis, Mo., a corporation of Delaware
No Drawing. Continuation-in-part of application Ser. No. 462,127, June 7, 1965. This application Mar. 22, 1966, Ser. No. 536,257
7 Claims. (Cl. 167—31)

ABSTRACT OF THE DISCLOSURE

Gastropodicidal methods employing 2'-chloro-4'-nitrosalicylanilides characterized by having a branched chain alkyl grouping in the 3-position of the salicyl nucleus.

This application is a continuation-in-part of copending application Ser. No. 462,127, filed June 7, 1965, now abandoned.

This invention relates to new and pesticidally useful substituted 2'-chloro-4'-nitrosalicylanilides of the formula:

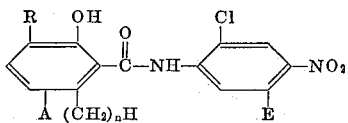

wherein $n$ is an integer from 0 to 1, wherein A is halogen of atomic weight in the range of 35 to 80 (that is chloro or bromo, but preferably chloro), wherein E is chloro or, and preferably hydrogen, and wherein R is alkyl containing from 3 to 8 carbon atoms specifically isopropyl or $C_{4-8}$ tert.alkyl of the formula:

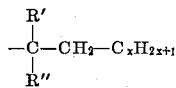

wherein R' and R" respectively are straight chain (or linear) alkyl and respectively satisfy the empirical formula $C_mH_{2m+1}$ wherein $m$ is a whole number from 1 to 3, inclusive, and wherein $x$ is an integer from 0 to 4, but preferably 0. It is preferred that R be $C_{4-6}$ tert.alkyl such as tert.butyl, tert.pentyl, 1,1-dimethyl-n-butyl and 1-ethyl-1-methyl-n-propyl. As illustrative of other variants of R are 1,1 - dimethyl-n-pentyl, 1,1 - dimethyl-n-hexyl, 1,1 - dimethyl-isoamyl, 1,1,3,3 - tetramethyl-n-butyl, 1 - ethyl - 1-methyl-n-butyl and 1,1-diethyl-n-butyl.

The compounds of this invention are prepared by reacting substantially one mole of a 2-chloro-4-nitroaniline of the formula:

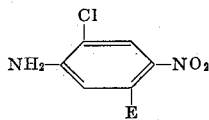

wherein E has the afore-described significance with substantially one mole of a substituted 5-halosalicylic acid of the formula:

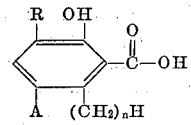

wherein $n$, A and R have the afore-described significance in the presence of from about 0.33 to about 1.0 mole of phosphorus trichloride and an inert organic liquid (e.g., benzene, toluene, xylene, chlorobenzene, dichlorobenzene, chlorotoluene, trichlorobenzene, and the like, and mixtures thereof) at a temperature above the freezing point of the reaction system up to and including the system's boiling point, however, in general the reaction temperature will be in the range of from about 60° C. to about 200° C. The substituted 2'-chloro-4'-nitrosalicylanilide end products are solids and are insoluble in water.

As illustrative of the 5-halosalicylic acid precursors are 3-isopropyl-5-chlorosalicylic acid (M.P. 169–170° C.), 3-tert.butyl-5-chlorosalicylic acid (M.P. 220–222° C.), 6-methyl-3-tert.butyl-5-chlorosalicylic acid (M.P. 208–211° C.), 3-tert.pentyl-5-chlorosalicylic acid (M.P. 195–198° C.), 6-methyl-3-tert.butyl-5-bromosalicylic acid (M.P. 170–173° C.), 3-(1,1-dimethyl-n-butyl)-5-chlorosalicylic acid (M.P. 154.5–155° C.), 3-(1-ethyl-1-methyl-n-propyl)-5-chlorosalicylic acid (M.P. 152–154° C.), 6-methyl-3-(1,1-dimethyl - n - butyl) - 5 - chlorosalicylic acid (M.P. 154.5–156° C.), 3-tert.butyl-5-bromosalicylic acid (M.P. 230–231.5° C.), and 3-(1,1,3,3-tetramethyl-n-butyl)-5-chlorosalicylic acid (M.P. 145–147° C.). The salicylic acid precursors for these 5-halosalicylic acids are either known materials or readily prepared by initially ortho-alkylating phenol or m-cresol with the appropriate olefin in accordance with the procedure of Stroh et al., Angew. Chem. vol. 69, pp. 699–706 (1957) to provide the substituted phenol

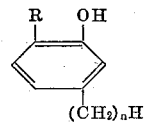

wherein R and $n$ have the afore-described significance (many of these substituted phenols are commercially available) and then carboxylating with carbon dioxide in the presence of aqueous sodium hydroxide in accordance with the Schmitt modification of the Kolbe synthesis (German Patents 29,939 and 38,742) and thereafter acidifying the sodium salt so produced. These salicylic acids are readily halogenated in the 5-position thereof employing chlorine or bromine in the presence of glacial acetic acid.

As illustrative of the compounds of this invention and their preparation but not limitative thereof is the following:

Example I

To a suitable reaction vessel equipped with a thermometer, agitator and reflux condenser is charged 8.6 parts by weight of 3-isopropyl-5-chlorosalicylic acid (M.P. 169–170° C.) and 55 parts by weight of chlorobenzene. The so charged mass is heated to about 70° C. and thereto is added with agitation 6.9 parts by weight of 2-chloro-4-nitroaniline followed by 2.5 parts by weight of phosphorus trichloride in 55 parts by weight of chlorobenzene. The reaction mass is then refluxed (about 135° C.) for five hours. The mass is then cooled to about 70° C. whereupon and with agitation is added 50 parts by weight of water followed by 50 parts by weight of 20 percent hydrochloric acid. The organic layer is separated and washed first with water then with dilute aqueous sodium bicarbonate and finally with water. The so washed organic mass is then stripped of volatiles under vacuum. The residue upon recrystallization from benzene gave 3-isopropyl-2',5-dichloro-4'-nitrosalicylanilide, M.P. 120–121° C.

Other illustrative examples of the compounds of this invention (Examples II to XIII below) prepared by the same procedure as in Example I but substituting the appropriate substituted salicylic acid and appropriate substituted aniline in the same molecular proportions are summarized in tabular form below:

Example No.:
- II ____ 3-tert.butyl-2',5-dichloro-4'-nitrosalicylanilide (M.P. 159–160° C.).
- III ____ 6-methyl-3-tert.butyl-2',5-dichloro-4'-nitrosalicylanilide (M.P. 153–155° C.).
- IV ____ 3-tert.pentyl-2',5-dichloro-4'-nitrosalicylanilide (M.P. 136–137° C.).
- V ____ 6-methyl-3-tert.pentyl-2',5-dichloro-4'-nitrosalicylanilide (M.P. 108.5–110.5° C.).
- VI ____ 6-methyl-3-tert.butyl-2'-chloro-5-bromo-4'-nitrosalicylanilide (M.P. 170–173° C.).
- VII ____ 3-(1,1-dimethyl-n-butyl)-2',5-dichloro-4'-nitrosalicylanilide.
- VIII ____ 3-(1-ethyl-1-methyl-n-propyl)-2',5-dichloro-4'-nitrosalicylanilide (M.P. 143–143.5° C.).
- IX ____ 6-methyl-3-(1,1-dimethyl-n-butyl)-2',5-dichloro-4'-nitrosalicylanilide (M.P. 78–81° C.).
- X ____ 6-methyl-3-tert.butyl-2',5,5'-trichloro-4'-nitrosalicylanilide (M.P. 138.5–140° C.).
- XI ____ 3-tert.butyl-2',5,5'-trichloro-4'-nitrosalicylanilide (M.P. 208.5–210° C.).
- XII ____ 3-tert.butyl-2'-chloro-5-bromo-4'-nitrosalicylanilide (M.P. 172.5–174.5° C.
- XIII ____ 3-(1,1,3,3-tetramethyl-n-butyl)-2',5-dichloro-4'-nitrosalicylanilide (M.P. 146–148° C.).

The salicylanilides of this invention are useful in combatting gastropods, such as the aquatic and amphibious snails, which are a class of animal life Gastropoda within the phylum Mollusca, which cause considerable agricultural and horiticultural damage, and the snails and slugs of this class of animal life which are the necessary intermediate host or vector in the life cycle of various common parasites, as for example the trematodes or flukes which are parasitic in man and animals causing schistomiasis and like diseases.

As illustrative of the gastropodicidal properties of the salicylanilides of this invention but not limitative thereof as compared to analogues thereof is the following:

Three snails (*Planobarius corneus*, the species of snail host of the cyclocoelid *Tracheophilus sisousi*, the blood fluke *Bilharziella polonica* and other trematodes) of 6 to 8 weeks of age are placed in a 200 x 32 mm. tube (three replicates) and thereto is added the salicylanilide to be evaluated in the form of an aqueous dispersion thereof having a concentration in parts per million, that is p.p.m., thereof as set forth below. (This dispersion is prepared by dissolving sufficient of the salicylanilide in 10 ml. of acetone to make a one percent by weight solution thereof and thereafter adding sufficient water to give the desired concentration.) The percent kill (i.e., the average of the three replicates of three snails of each salicylanilide) at the end of 24 hours at room temperature for each of the below itemized salicylanilides at the itemized concentration in parts per million was found to be as follows:

| Salicylanilide | Percent Kill at a Conc. in p.p.m. of— | | |
|---|---|---|---|
| | 1.0 | 0.1 | 0.01 |
| 2',5-dichloro-4'-nitrosalicylanilide | 100 | 60 | 0 |
| 3-isopropyl-2',5-dichloro-4'-nitrosalicylanilide | 100 | 100 | 30 |
| 3-tert.butyl-2',5-dichloro-4'-nitrosalicylanilide | 100 | 100 | ------- |
| 6-methyl-3-tert.butyl-2',5-dichloro-4'-nitrosalicylanilide | 100 | 100 | 100 |
| 3-tert.pentyl-2',5-dichloro-4'-nitrosalicylanilide | 100 | 100 | ------- |
| 3-tert.butyl-2',5-dichloro-5'-nitrosalicylanilide | 100 | 10 | 0 |
| 3-tert.butyl-4',5-dinitro-2'-chlorosalicylanilide* | 100 | 0 | ------- |
| 3-n-hexyl-2',5-dichloro-4'-nitrosalicylanilide | 50 | 0 | ------- |
| 2',3,5-trichloro-4'-nitrosalicylanilide | 100 | 0 | ------- |
| 3-tert.butyl-2',5-dichloro-2'-nitrosalicylanilide | 30 | 0 | ------- |
| 3'-(trifluoromethyl)-4'-nitro-5-chloro-salicylanilide | 100 | 0 | ------- |
| 3-tert.butyl-3'-(trifluoromethyl)-4'-nitro-5-chlorosalicylanilide | 100 | 10 | 0 |
| 3-tert.butyl-4',5-dichlorosalicylanilide | 0 | 0 | ------- |
| 3,3',4',5-tetrachlorosalicylanilide | 100 | 0 | ------- |

*Prepared by nitrating with a $HNO_3$-$H_2SO_4$ mixture 3-tert.butyl-2'-chloro-4'-nitrosalicylanilide (M.P. 168–169° C.), the latter being prepared as aforedescribed by reacting 2-chloro-4-nitroaniline and 3-tert.butyl-salicylic acid in the presence of phosphorus trichloride.

In combatting the aquatic Gastropoda it is necessary to apply the gastropodicide to the waters or land areas adjacent thereto which form their habitats, and therefore to be practical the compounds of this invention must exhibit gastropodicidal activity at relatively high dilutions.

In combatting the amphibious Gastropoda the compounds of this invention can be employed per se or formulated into a dust and dispersed or scattered on vegetation or on the ground along banks of streams, rivers, irrigation canals, or the edges of other bodies of water so that the amphibious Gastropoda will come in contact with the gastropodicidal agent when it leaves the water and begins to travel across ground areas.

Where the Gastropoda sought to be combatted has a water habitat the compounds of this invention can be added per se to the water, or in the form of a formulated dust cast on the surface of the water, or sprayed on the water in the form of a solution thereof or a liquid emulsion formulation thereof.

Inert diluent powders for the formulation of such dusts include fuller's earth, diatomaceous earth, bentonite, talc, pyrophillite, soybean flour, wood flour, and walnut shell flour, which dusts preferably have a particle size of 5 microns or below and contain from 10 to 75 percent by weight of a compound of this invention. Ordinarily such dusts will be applied at the rate of about 25 to 50 pounds per acre of surface area. These dusts can also contain from 1 to 5 percent by weight of a non-ionic surfactant to provide a "wettable" dust formulation. Liquid formulations can be prepared by dissolving the compounds of this invention in a suitable organic solvent such as acetone and sprayed as such or in admixture with a non-ionic emulsifier to form a liquid emulsion formulation for spray purposes. The actual effective concentration of the compound of this invention for gastropodicidal purposes will depend upon the particular Gastropoda, weather conditions, and whether it is to be applied directly to the water which forms the habitat for the Gastropoda or to land areas which are crossed by amphibious Gastropoda either as the compound per se or in the form of formulations thereof. Those skilled in this art can readily determine the proper concentration for any particular application by knowing the particular dilution factor, which is generally expressed as the maximum aqueous dilution which will produce a 50% kill at a dilution of one part by weight per 8000 parts by weight of water.

The embodiments of the invention in which an exclusive property or privilege is claimed are defined as follows:

1. A method of combatting gastropods which comprises subjecting the gastropods to a gastropodicidally toxic amount of a substituted 2'-chloro-4'-nitrosalicylanilide of the formula

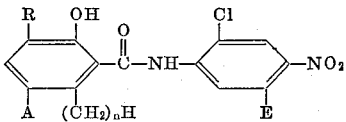

wherein *n* is an integer from 0 to 1, wherein A is halogen of atomic weight in the range of 35 to 80, wherein E is selected from the group consisting of hydrogen and chloro, and wherein R contains from 3 to 8 carbon atoms and is selected from the group consisting of isopropyl and $C_{4-8}$ tert.alkyl of the formula

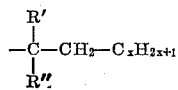

wherein R' and R" respectively are straight chain alkyl of the formula $C_mH_{2m+1}$ wherein *m* is a whole number from 1 to 3, and wherein *x* is an integer from zero to 4.

2. A method of claim 1 wherein A is chloro, wherein E is hydrogen, wherein R contains from 4 to 6 carbon atoms and is $C_{4-6}$ tert.alkyl, and wherein *x* is zero.

3. A method of claim 1 wherein *n* is zero, wherein A is chloro, wherein E is hydrogen, and wherein R is tert.butyl.

4. A method of claim 1 wherein *n* is zero, wherein A is chloro, wherein E is hydrogen, and wherein R is tert.pentyl.

5. A method of claim 1 wherein *n* is one, wherein A is chloro, wherein E is hydrogen, and wherein R is tert.butyl.

6. A method of claim 1 wherein *n* is one, wherein A is chloro, wherein E is hydrogen, and wherein R is tert.pentyl.

7. A method of claim 1 wherein *n* is zero, wherein A is chloro, wherein E is hydrogen, and wherein R is isopropyl.

References Cited

UNITED STATES PATENTS 3,079,297    2/1963    Schraufstatter _____ 167—31

ALBERT T. MEYERS, *Primary Examiner.*

S. FRIEDMAN, *Assistant Examiner.*